US008065022B2

(12) United States Patent
Minto et al.

(10) Patent No.: US 8,065,022 B2
(45) Date of Patent: Nov. 22, 2011

(54) METHODS AND SYSTEMS FOR NEURAL NETWORK MODELING OF TURBINE COMPONENTS

(75) Inventors: Karl Dean Minto, Ballston Lake, NY (US); Jianbo Zhang, Clifton Park, NY (US); Erhan Karaca, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1188 days.

(21) Appl. No.: 11/971,022

(22) Filed: Jan. 8, 2008

(65) Prior Publication Data

US 2010/0100248 A1 Apr. 22, 2010

Related U.S. Application Data

(63) Continuation-in-part of application No. 11/220,101, filed on Sep. 6, 2005.

(51) Int. Cl.
*G05B 13/02* (2006.01)
*G06E 1/00* (2006.01)
*G06F 15/00* (2006.01)
*G06F 17/50* (2006.01)
*G06F 7/60* (2006.01)
*F16D 33/02* (2006.01)
*F02C 6/08* (2006.01)

(52) U.S. Cl. ............... 700/29; 60/350; 60/782; 706/31; 706/44; 706/904; 706/920; 703/1; 703/2; 703/6

(58) Field of Classification Search ............... 700/29; 706/31, 44, 904, 920; 703/7, 18, 1, 2, 6; 60/350, 782
See application file for complete search history.

(56) References Cited

U.S. PATENT DOCUMENTS

| | | | | |
|---|---|---|---|---|
| 2,994,472 A | * | 8/1961 | Botje | 417/352 |
| 4,029,951 A | * | 6/1977 | Berry et al. | 700/289 |
| 4,181,840 A | * | 1/1980 | Osborne | 290/40 R |
| 4,764,750 A | * | 8/1988 | Kawada | 341/122 |
| 4,849,895 A | * | 7/1989 | Kervistin | 701/100 |
| 4,940,983 A | * | 7/1990 | Phillips et al. | 341/171 |
| 5,023,045 A | * | 6/1991 | Watanabe et al. | 376/215 |
| 5,331,579 A | * | 7/1994 | Maguire et al. | 703/2 |
| 5,390,469 A | * | 2/1995 | Shimizu et al. | 53/53 |
| 5,394,147 A | * | 2/1995 | Miyake | 341/161 |
| 5,418,710 A | * | 5/1995 | Ono et al. | 700/29 |

(Continued)

OTHER PUBLICATIONS

Lu et al., "An Evaluation of Engine Faults Diagnostic Using Artificial Neural Networks", 2001, ASME, p. 340-346.*

(Continued)

*Primary Examiner* — Albert Decady
*Assistant Examiner* — Thomas Stevens
(74) *Attorney, Agent, or Firm* — Sutherland Asbill & Brennan LLP

(57) ABSTRACT

Embodiments of the invention can include methods and systems for controlling clearances in a turbine. In one embodiment, a method can include applying at least one operating parameter as an input to at least one neural network model, modeling via the neural network model a thermal expansion of at least one turbine component, and taking a control action based at least in part on the modeled thermal expansion of the one or more turbine components. An example system can include a controller operable to determine and apply the operating parameters as inputs to the neural network model, model thermal expansion via the neural network model, and generate a control action based at least in part on the modeled thermal expansion.

20 Claims, 9 Drawing Sheets

U.S. PATENT DOCUMENTS

| | | | |
|---|---|---|---|
| 5,633,800 A * | 5/1997 | Bankert et al. | 700/177 |
| 5,779,442 A * | 7/1998 | Sexton et al. | 415/173.2 |
| 5,832,421 A | 11/1998 | Santoso | |
| 5,857,321 A | 1/1999 | Rajamani | |
| 6,272,422 B2 * | 8/2001 | Khalid et al. | 701/100 |
| 6,393,331 B1 * | 5/2002 | Chetta et al. | 700/97 |
| 6,487,491 B1 * | 11/2002 | Karpman et al. | 701/100 |
| 6,559,788 B1 * | 5/2003 | Murphy | 341/164 |
| 6,679,045 B2 * | 1/2004 | Karafillis et al. | 60/39.08 |
| 6,745,109 B2 | 6/2004 | Kojima | |
| 6,775,597 B1 | 8/2004 | Ristanovic | |
| 6,786,635 B2 | 9/2004 | Choi | |
| 6,853,945 B2 | 2/2005 | Namburi | |
| 6,868,363 B2 | 3/2005 | Baran | |
| 6,939,100 B2 * | 9/2005 | Kirchhof | 415/1 |
| 7,409,319 B2 * | 8/2008 | Kant et al. | 702/188 |
| 7,621,716 B2 * | 11/2009 | Regunath | 415/1 |
| 2004/0019469 A1 * | 1/2004 | Leary et al. | 703/2 |
| 2004/0204900 A1 * | 10/2004 | Namburi | 702/136 |
| 2005/0015421 A1 | 1/2005 | Fuller | |
| 2006/0282177 A1 | 12/2006 | Fuller | |
| 2007/0055392 A1 | 3/2007 | D'Amato | |

OTHER PUBLICATIONS

Xia et al.,"Simulation Study on Temperature Distribution of Steam Turbine Rotor", 1996, Taiyuan Univ of Technology, First Taiyuan Poweer Plant, Translated, 22 pages.*

Qing et al., "Neural Network Modeling of the Differential Expansion of a 200MW Steam Turbine", 1996, IEEE, 4 pages.*

Hu et al.,"Design and Analysis of Thermal Performance for Cryogenic Helium Expansion Turbine", 2003, Institute of Cryogenic Engineering, p. 666-669.*

Nakayama et al., "Cutting Error Prediction by Multilayer Neural Networks for Machine Tools with Thermal Expansion and Compression", 2002, IEEE , 1373-1378.*

Urakawa et al., "New High Voltage Insulation System for Air-Cooled Turbine Generators" IEEE, 2002, p. 353-358.*

Pasupuleti et al., "Soft Computing Techniques for Determining the Effective Young's Modulus of Materials in Thin Films", IEEE,2006, 6 pages.*

Kuljaca et al., "Neural Network Frequency Control for Thermal Power Systems", 2004, IEEE, 6 pg.*

Translation of "Design and Analysis of Thermal Performance for Cryogenic Helium Expansion Turbine" by Yu Hou et al., Journal of Xi'An Jiaotong University, vol. 37, Jul. 2003, p. 666-669.*

* cited by examiner

METHODS AND SYSTEMS FOR NEURAL NETWORK MODELING OF TURBINE COMPONENTS

CROSS-REFERENCE TO RELATED APPLICATIONS

This application is a continuation-in-part of U.S. patent application Ser. No. 11/220,101 filed Sep. 6, 2005, which is incorporated by reference in its entirety herein.

TECHNICAL FIELD

The invention relates generally to turbine control systems, and more particularly relates to methods and systems for providing neural network modeling of turbine components.

BACKGROUND OF THE INVENTION

Industrial and power generation turbines have control systems that monitor and control their operation. These control systems include control algorithms that can govern some or all operational aspects of the turbine.

Current control algorithms attempt to load (or unload) turbines, generators and various other components as may be applicable during load set point changes as fast as possible without violating the limits that facilitate a safe operation. However in such traditional systems and methods, the loading rates are typically limited by the structural constraints such as the highest stresses allowed in the rotor of a steam turbine to regulate life expenditure and other operational constraints such as clearance between rotating and non-rotating parts in the turbine. If the loading rates for various turbines are very high, large thermal gradients may develop in the turbines leading to high stresses and uneven thermal expansion that may result in contact or rubs between stationary and rotating parts. On the other hand, slow loading rates facilitate a safe operation but increase fuel costs and reduce plant availability. Because of an inability to accurately predict conditions within a plant, typical control methods use an unduly slow standard profile to facilitate safe operation. For instance, according to the measured metal temperatures at the beginning of the startup, the current controls may categorize the start-ups as hot, warm, or cold. Each of these start-up states uses loading rates slow enough to facilitate a safe operation for any startup in the same category. Consequently, such controlling methods may result in sub-optimal performance and higher operating costs.

One factor in the efficiency of a turbine such as, for example, a heavy-duty gas turbine, is the turbine clearance between the blade tips and the casing of the turbine. If the turbine clearance is maintained at a minimum level, the turbine will operate more efficiently because a minimum amount of air/exhaust gas will escape between the blade tips and the casing. Accordingly, a greater percentage of the air and gas entering the turbine will be used to drive the turbine blades and create work.

Due to the different thermal and mechanical growth characteristics of turbine rotor assemblies and the turbine casing, the turbine clearance may significantly change as the turbine transitions between different stages of operation such as from initial start-up to a base load steady-state condition. A clearance control system may be implemented in the turbine to address the turbine clearance conditions during the operation of the turbine. However, it may be advantageous to provide a control system that is able to dynamically monitor and predict turbine clearance conditions and component expansion, so as to allow for operating the turbine in its most efficient ranges.

Thus, there is a desire for systems and methods that provide for neural network based models to predict clearances in a turbine and for implementation in a control system to regulate clearances during its transient operation.

There is a further need for systems and methods for neural network modeling of turbine components.

BRIEF DESCRIPTION OF THE INVENTION

In accordance with one example embodiment of the invention, a method for controlling clearance in a turbine is provided. The method can include applying at least one operating parameter as an input to at least one neural network model, modeling via the neural network model a thermal expansion of at least one turbine component, and implementing a control action based at least in part on the modeled thermal expansion of the one or more turbine components.

In accordance with another example embodiment of the invention, a system for controlling a turbine is provided. The system can include a controller. The controller can be operated to determine at least one operating parameter, apply the one or more operating parameters as an input to a neural network model, model via the neural network model the thermal expansion of at least one turbine component, and generate a control action based at least in part on the modeled thermal expansion of the one or more turbine components.

In accordance with yet another example embodiment of the invention, a method for modeling turbine clearance is provided. The method can include the elements of sensing a first and a second operating parameter, modeling at least one shell temperature parameter based at least in part on the first sensed operating parameter, and modeling at least one rotor temperature parameter based at least in part on the second sensed operating parameter. The method additionally can include the elements of determining a shell thermal expansion by applying the one or more shell temperature parameters as an input or inputs to a shell expansion neural network model, determining a rotor thermal expansion by applying the one or more rotor temperature parameters as an input or inputs to a rotor expansion neural network model, and determining a differential expansion based at least in part on the difference between the rotor thermal expansion and the shell thermal expansion.

These and other features of embodiments of the invention will become apparent upon review of the following detailed description when taken in conjunction with the several drawings and the appended claims.

DETAILED DESCRIPTION OF THE INVENTION

Figure 1:
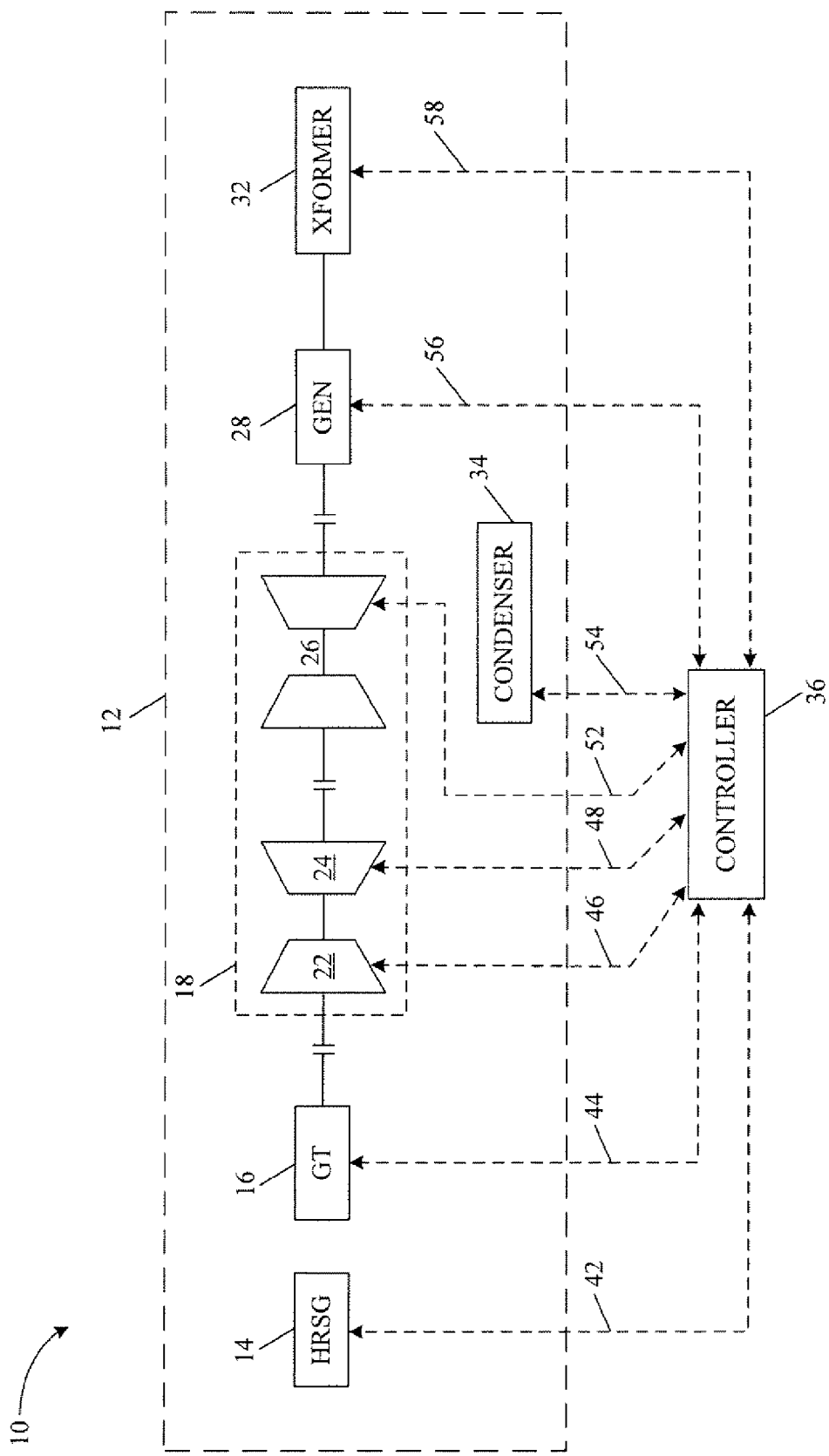
FIG. 1 is a schematic diagram of an exemplary prior art system for control of a combined cycle power plant.

Embodiments of the invention can comprise model predictive control systems and methods and neural network models implemented by these control systems and methods. Embodiments of such systems and methods may improve on real time computation and implementation of sub-optimal input profiles used for loading and unloading of various systems, subsystems and components in a power plant control system and enhance the proper models, optimizations, objective functions, constraints and/or parameters in the control system to allow the control system to quickly take improved action to regain as much performance and/or operability as possible given the current power plant condition.

In example embodiments of the invention, any physical system, control system or property of the power plant or any power plant subsystem may be modeled, including, but not limited to, the power plant itself, the gas path and gas path dynamics; actuators, effectors, or other controlling devices that modify or change behavior of any turbine or generator; sensors, monitors, or sensing systems; the fuel or steam metering system; the fuel delivery system; the lubrication system; and/or the hydraulic system. The models of these components and/or systems may be physics-based models (including their linear approximations). Additionally or alternatively, the models may be based on linear and/or nonlinear system identification, neural networks, and/or combinations of all of these.

In another example embodiment of the invention, methods and systems for controlling clearance in a turbine may be provided. The methods may include, but are not limited to, applying at least one operating parameter as an input to at least one neural network. The methods may further include modeling via the neural network model or models a thermal expansion of at least one turbine component. Additionally, the methods may include implementing a control action based at least in part on the modeled thermal expansion. In a similar example embodiment, a system for controlling a turbine may be provided. The system may be operable to determine at least one operating parameter and to apply the operating parameter or parameters as an input or inputs to at least one neural network model. The system may further be operable to model via the neural network model or models a thermal expansion of at least one turbine component and to generate a control action based at least in part on the modeled thermal expansion.

Embodiments of the invention can perform or otherwise facilitate certain technical effects including, but not limited to, improving upon real-time or quasi-real-time computation and implementation of input profiles used for loading and unloading of various systems, subsystems, and components in a power plant control system. These improved input profiles may have the technical effect of allowing the control system to take improved action to regain performance and/or operability given the current power plant condition. Additionally, further embodiments of the invention can perform or otherwise facilitate the technical effects of determining a thermal expansion of at least one turbine component, for example, determining rotating components via at least one neural network model. This modeled thermal expansion may have the effect of allowing a control action to be generated, based at least in part on the modeled thermal expansion, that may control or affect the operation of the power plant or its components. For example, the modeled thermal expansion of rotating components, or components associated with rotating components, may be used to control or effect turbine operation in response to predicted or modeled component clearances, such as axial clearances.

Power plants are mechanical structures and installations where electricity is produced by generators powered in a variety of ways, steam turbines being the most common. Typically, in a steam turbine, heat is used to turn water to steam, which is passed through the blades of the turbine to generate rotational motion. The turbines in turn drive a shaft and turn the generators. Regardless of the source of heat, the principle of power generation remains the same. In various other instances, other sources such as coal, oil, natural gas, biomass, nuclear may be used in steam turbines. Some other known sources of electricity also use turbines, such as hydropower plants, in which turbine blades are turned by the kinetic energy of water. In other typical instances, gas turbines are used and these turbines operate by passing the hot gases produced from combustion of natural gas or oil directly through a turbine. Internal combustion engines such as diesel generators are other portable and instantaneous sources of electricity used for emergencies, and reserve. In other instances, the power generating units can utilize more than one type of fuel, for example, coal or natural gas, and these plants are known as dual-fired units and may be either sequentially fired or concurrently fired. Sequential plants use one fuel after the other, concurrent plants can use two fuels at the same time. Some other non-limiting examples of power plant include: fossil power plants, combined cycle power plants, nuclear power plants or the like.

Reference will now be made to embodiments as illustrated in FIGS. 1-9.

Model Predictive Control of a Power Plant

FIG. 1 is a schematic diagram of an exemplary system 10 for control of an exemplary combined cycle power plant 12. The combined cycle power plant 12 shown can include a heat recovery steam generator 14, a gas turbine 16, and a steam turbine 18. The steam turbine 18 typically has three sections depending on varying pressure conditions prevailing in each of them. In this embodiment, there is a high pressure section 22, an intermediate pressure section 24, and a low pressure section 26. In addition, the power plant 12 typically includes a generator 28, a transformer 32 and a condenser 34. During operation of the combined cycle electric power plant 12, hot exhaust gas from the gas turbine 18 can typically be supplied to a boiler or steam generator for providing heat for producing steam, which drives the steam turbine 18 through its three different sections—the high pressure section 22, the intermediate pressure section 24 and the low pressure section 26. The turbines 16, 22, 24 and 26 can drive one or more electric generators 28, which produce usable electricity in tandem with the transformer 32. The gas turbine 16 is associated with the heat recovery steam generator 14, which receives condensed steam from the condenser 34 of the steam turbine 18. The electricity thus produced can be supplied by an electric utility system to various industrial, commercial and residential customers.

In other combined cycle plants, further heat may be supplied to the steam generator via additional or supplemental burner mechanisms. In either case, such typical combined cycle plants 12 are relatively complex in nature and a relatively large number of sensors such as pressure transducers, proximity sensors and actuator mechanisms are provided for adjusting, regulating and monitoring the operations of the various turbines, generator and burner units and other auxiliary equipment normally associated therewith. In yet other instances of combined cycle power plants, arrangements of gas and steam turbines, steam generation sources and waste heat recovery apparatus may be employed.

Referring to FIG. 1, the control system 10 can also include a controller 36 to control and coordinate the activities of some or all of the systems, subsystems and components of the power plant 12 such as the heat recovery steam generator 14, the gas turbine 16, the three sections of the steam turbine 18—the high pressure section 22, the intermediate pressure section 24, and the low pressure section 26, the generator 28, the transformer 32, and the condenser 34; and thereby coordinate the overall functioning of the combined cycle power plant 12. In FIG. 1, the controller 36 is physically positioned outside all the systems, components and subcomponents of the power plant 12 for conceptual clarity. In another example embodiment, the controller 36 may be housed inside the power plant 12 and may be integrated as a part of the power plant 12. Structurally, the controller 36 may comprise a micro-controller or a solid-state switch configured for communication with all the power plant systems, subsystems and components in the communication network.

Communication between the controller 36 and the heat recovery steam generator 14 may take place using a communication line 42. Such communication typically includes both sensing signals carried to the controller 36 and command signals generated from the controller 36. In a like manner, communication between the controller 36 and the gas turbine 16 may take place using the communication line 44, between the controller 36 and the high pressure section 22 of steam turbine 18 may take place using the communication line 46, between the controller 36 and the intermediate pressure section 24 of steam turbine 18 may take place using the communication line 48, and between the controller 36 and the low pressure section 26 of steam turbine 18 may take place using the communication line 52. In a like manner, communication between the controller 36 and the condenser 34 may take place using the communication line 54, between the controller 36 and the generator 28 may take place using the communication line 56, and between the controller 36 and the transformer 32 may take place using the communication line 58.

In operation, controller 36 monitors and controls the operational parameters in the power plant control system 10. In one example embodiment, the controller 36 determines and interprets various operational parameters of the power plant control system 10 based at least in part on the sensing signals from various systems, subsystems and components of the power plant 12 such as the heat recovery steam generator 14, the gas turbine 16, the three sections of the steam turbine 18—the high pressure section 22, the intermediate pressure section 24 and the low pressure section 26, the generator 28, the transformer 32, and the condenser 34 disposed in the power plant control system 10. The determination and interpretation by the controller 36 can be performed in accordance with a predetermined criterion. For instance, in one case, a predetermined criterion may include a binary comparison of the temperature of a power plant component such as the heat recovery steam generator 14 with a predetermined reference value of temperature. In another instance, a predetermined criterion may comprise comparison of the temperature of the same heat recovery steam generator 14 with a predetermined maximum value of temperature. In yet another instance, a predetermined criterion may comprise comparison of the temperature of heat recovery steam generator 14 with a predetermined minimum value of temperature.

Depending on any number of operational parameters sensed and determined at various sensing points in the power plant 12 as explained above, the controller 36 monitors and controls the input loading and unloading profiles of various subsystems and components of the power plant 12 such as the heat recovery steam generator 14, the gas turbine 16, the three sections of the steam turbine 18—the high pressure section 22, the intermediate pressure section 24 and the low pressure section 26, the generator 28, the transformer 32 and the condenser 34 so that the appropriate operating conditions of the power plant 12 and all its subsystems and components are maintained during a typical operation cycle of the power plant 12 and the power plant control system 10.

Regardless of the criterion for comparison, if the loading or unloading rates in any of the systems, subsystems or components of the power plant 12 falls outside of a predetermined reference range for safety, the controller 36 may determine that the loading or unloading status of the relevant subsystem or component is not acceptable and the subsystem or component needs additional corrective control actions. In that event, the controller 36 can send appropriate command signals to the relevant subsystem or component and regulate the input profiles for loading or unloading of the relevant subsystem or component. The resulting loading or unloading rate of the relevant subsystem or component can thereby be corrected to be safe and accurate. In another example embodiment, if the controller 36 senses that a particular subsystem or component needs extra corrective control action, the controller 36 can send an alarm signal to the alerting system and the alerting system in turn can generate an appropriate alarm to a process observer at a remote location to take suitable action.

One embodiment relates to a systematic approach for accommodating inputting optimal loading or unloading profiles in real time in the power plant 12 and associated systems, subsystems and the components. This can be accomplished in part by updating the states and parameters of the models in a model predictive control system based at least in part on sensor measurements. State updates in a typical model predictive control system can account for changes in the plant operation, like steam temperature rise due to increased fuel flow. Parameter updates in a typical model predictive control system may account for component-to-component variation, deterioration, mechanical, electrical or chemical faults, failures, or damage to the turbine or generator or any of the turbine or generator components, and mechanical, electrical or chemical faults, failures or damage to the control system and/or its components.

Figure 2:
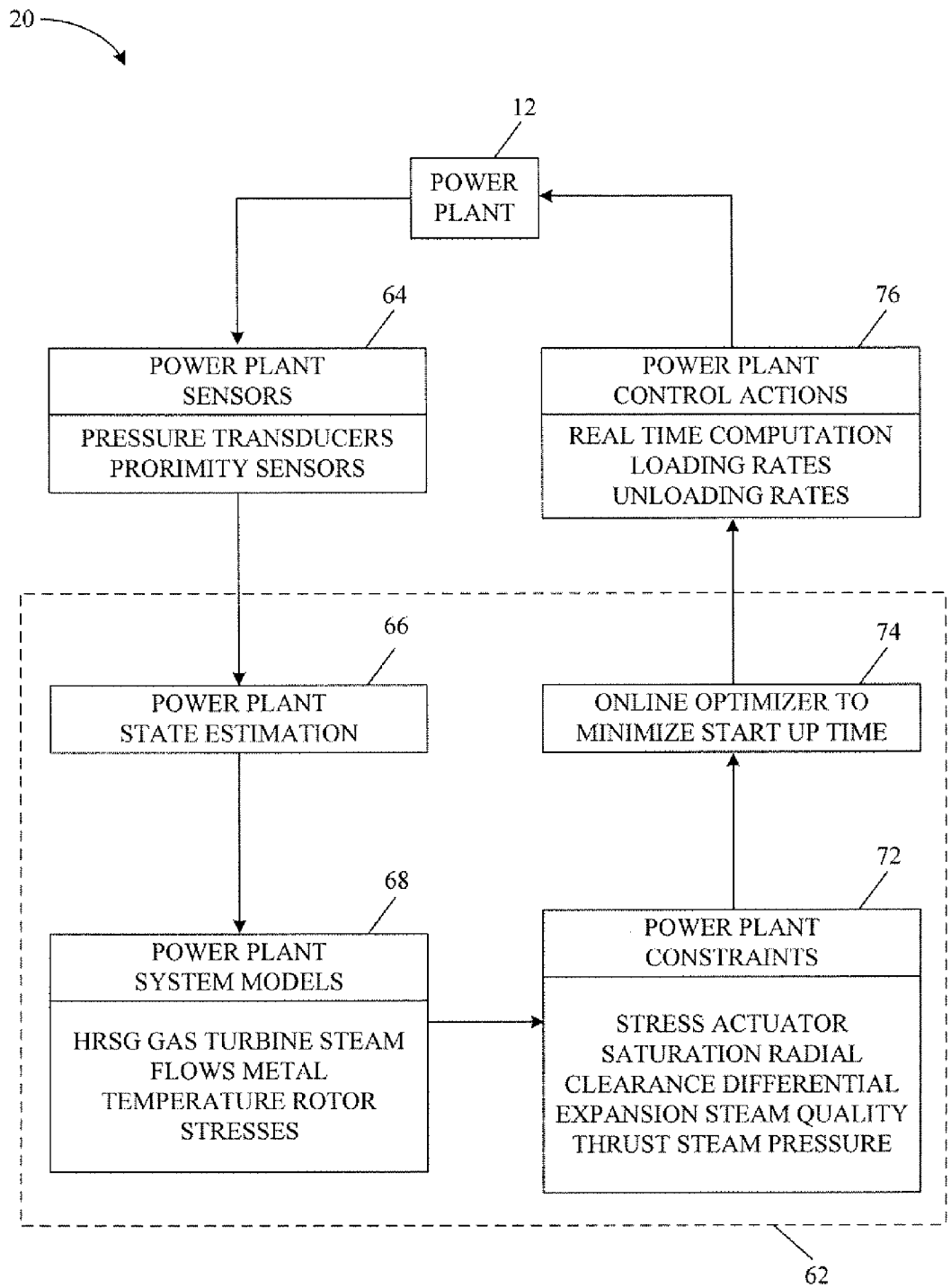
FIG. 2 is a schematic diagram for controller action for a power plant in accordance with one embodiment of the invention.

FIG. 2 is an exemplary schematic diagram of a system 20 and its associated controller functionality for the combined cycle power plant 12 of FIG. 1 in accordance with one example embodiment of the invention. A controller 62 can be equipped with various hardware components and a model predictive software algorithm to enable optimal loading and unloading of the systems, subsystems and components of a power plant 12. Functions of the controller 62 are denoted by a series of blocks 66, 68, 72, 74 within a single functional block and functional block 64 illustrates the action of multiple sensors coupled with various systems, subsystems and components of the combined cycle power plant 12. Based at least in part on the sensing signals from the sensors, state estimation of the combined cycle power plant 12 can be carried out by the controller 62 as illustrated in functional block 66.

Based at least in part on the state estimation, system models of the combined cycle power plant 12 can be built by the controller 62 as illustrated in functional block 68. At the same time, system constraints of the combined cycle power plant 12 can be taken into consideration as illustrated in functional block 72 for building the system models as illustrated in functional block 68. In functional block 74, an online-optimizer can perform a real time model predictive optimization of the input loading and unloading profile of the combined cycle power plant 12. Details of the model predictive optimization algorithm are further described herein. Finally, in functional block 76, the control cycle of the combined cycle power plant 12 can be completed with appropriate control actions as commanded by the controller 62.

The subject matter described herein is not limited to the above mentioned combined cycle power plant 12 as a whole specifically. In other embodiments, any number of estimators and/or optimizers may determine various objective functions, constraints, and models of the other systems, subsystems and components to be used by the model predictive control. A typical logic function of the system 20 of FIG. 2 may receive information from both a diagnostic function and an operator or a supervisory controller. This information may then be processed to determine a suitable form of the relevant objective functions, constraints, and models. The logic functionality is described here in relation to the complete power plant 12, but it could be generalized to real time control and management of optimal loading and unloading of some or all of its associated systems, subsystems and components as described below.

In one example embodiment, the controller 62 can include an analog-to-digital converter accessible through one or more analog input ports. In another embodiment, the controller 62 may include read-out displays, read-only memory, random access memory, and a conventional data bus. In one embodiment, the sensors installed over the systems, subsystems and the components of the power plant 12 typically communicate with the controller 62 using at least one standard communication protocol such as a serial or an ethernet communication protocol.

The controller 62 may be embodied in several other ways. In one example embodiment, the controller 62 may include a logical processor, a threshold detection circuitry and an alerting system. Typically, the logical processor is a processing unit that performs computing tasks. It may be a software construct that comprises software application programs or operating system resources. In other instances, it may also be simulated by one or more physical processor(s) performing scheduling of processing tasks for more than one single thread of execution thereby simulating more than one physical processing unit. The controller 62 aids the threshold detection circuitry in estimating different operational parameters such temperature, pressure, stress level, fatigue level of the system, sub-systems and components of the power plant 12 such as the heat recovery steam generator 14, the gas turbine 16, the three sections of the steam turbine 18—the high pressure section 22, the intermediate pressure section 24 and the low pressure section 26, the generator 28, the transformer 32 and the condenser 34.

In one example embodiment, in relation to the operation of the whole power plant 12, operational parameters related to the operation of valves in a steam turbine or operational parameters related to supply water valves operation in a heat recovery steam generator or typical rotor stress can be tracked by the controller 62. In another embodiment, in relation to the gas turbine 16, quantity of fuel flow, operational parameters related to inlet guide vanes operation for the steam turbine 18 may be tracked. Moreover, the input profile for loading and unloading of the gas turbine 16 can be adjusted in such a way that high thermal gradients do not set in. The controller 62 can continuously track any number of sensing signals from the gas turbine 16, the steam turbine 18, and other such components, and can operate such that these operational parameters of the components and the power plant 12 as a whole are within safe and optimal control limits.

One aspect with respect to the use of model predictive controls is to use the model predictions of the performance over time intervals, ranging from several seconds to several hours, to optimize input loading profiles from any initial load to any final load via constrained optimization, starting from the current system state of a start-up. Generally speaking, model predictive control is a control paradigm used to control processes that explicitly handle the physical, operational, safety, and/or environmental constraints while maximizing at least one performance criterion.

The models in control system 20 may be built using any suitable method to modify states, variables, quality parameters, constraints, limits or any other adaptable parameter of the models so that the performance and limitations of the models match or otherwise approximate that of the physical turbine or generator after the parameter is changed. Using the information about any detected changes, together with the updated model, the model predictive control system 20 can evaluate the current and future conditions of the power plant 12 and its systems, subsystems and components, and implement a more optimized control action than would have been possible if the models had not been updated and if such information had not been passed to the control system. One aspect of these systems and methods is that, since they can be updated in real-time, they can allow for optimal loading calculations for any range of initial states of the components, not just finite set of sub-optimal, standard loading profiles already programmed into the control system. In an exemplary situation, the prediction horizon during a start up may typically range from about 5 minutes to about 2 hours.

Controlling the performance and/or operability of a combined cycle power plant 12 of FIG. 1 can include analyzing multiple variables to determine the appropriate control values that are needed to produce the desired output. These multiple variables can affect each other in a nonlinear manner, and thus should be operated on accordingly. Creating models to represent the various effects that multiple variables have on each other within a specific system can be difficult when accuracy and response speed are important, such as with modern power systems Since not every eventuality is likely to be covered in such models, it is desirable for such models to reconfigure, adapt and learn to make predictions or corrections based on turbine or generator sensor data. In one example embodiment, such adaptability for normal or sub-optimal loading and unloading conditions can be performed by a state estimator to calculate the current state of various models such as models of steam temperatures, pressures, metal temperatures, or the like. In another embodiment, adaptability may be performed by a diagnosis algorithm or system to detect faults or malfunction in sensors, actuators or any other component of the power plant 12. In a further embodiment, such adaptability for sub-optimal loading and unloading conditions may also be performed by using the sensor based diagnostics, which can select between different models, modify model inputs, outputs, or interior parameters, or can modify the optimizations, objective functions, constraints, and/or parameters in the control. Then, given the modified models, optimizations, objective functions, constraints and/or parameters, a computationally efficient optimizer may be used so that improved performance and/or operability can be obtained.

Strong nonlinearities may be present in various subsystems and components of the power plant 12 due to the large range of operating conditions and power levels experienced during operation. Also, operation of the power plant 12 can typically be restricted due to various mechanical, aerodynamic, thermal and flow limitations. In one embodiment, model predictive controls may be ideal for use for such environments because they can specifically handle the nonlinearities, and both the input and output constraints of many variables, all in a single control formulation. Model predictive controls are typically feedback controls that use models of the process/system/component to predict the output up to a certain instant of time, based on the inputs to the system and the most recent process measurements.

The models in the model predictive controls are designed to replicate both transient and steady state performance. These models can be used in their nonlinear form, or they can be linearized or parameterized for different operating conditions. Typical model predictive control techniques take advantage of the models to gain access to parameters or physical magnitudes that are not directly measured. These controls can be multiple-input multiple-output (MIMO) to account for interactions of the control loops, they can be model-based or physics based and they can have limits or constraints built as an integral part of the control formulation and optimization to get rid of designing controllers modes or loops for each limit. One embodiment of this invention includes calculating the actions of the controller 62 based at least in part on a set of objective functions and a set of constraints that can be used as part of a chosen optimization objective. Typical objective functions may include various performance criteria such as minimization of startup time, minimization of fuel costs, minimization of emissions, maximization of plant operability and the like. Typical constraints considered may include mechanical constraints, thermal and other stresses developed in different systems, subsystems and components of the power plant 12, such as thrust force at the bearings, actuator saturation, radial clearances between various rotating parts, differential expansion between various adjoining parts, maintenance of steam quality, maintenance of water level in boilers, and steam and metal temperatures and steam pressures at different locations or components in the combined cycle power plant 12.

In order to detect smaller sub-optimal operating conditions and to make enhanced control decisions, the control system 20 preferably has as much input information as possible about the power plant 12 and its subsystems and components that it is controlling. One way to obtain this input information about the system is to use dynamic models, which can provide information about how different operating parameters of the power plant 12 should respond given the current ambient conditions and actuator commands, the relationships between parameters in the system, the relationships between measured and unmeasured parameters, and the parameters that indicate the overall start-up status of the power plant 12. If the models are dynamic, then some or all of this information can be found on both a steady state and transient basis. The models can also be used to analyze a profile of past measurements or current performance, or it can be used to predict how the power plant 12 will behave over a specific time horizon.

In one example embodiment, the models may be physics-based, and/or system identification-based. In another embodiment, the models may represent each of the main components of the power plant 12 at a system level, including for example, the heat recovery steam generator 14 with and without additional firing unit, the gas turbine 16, the high-pressure section 22 of the steam turbine 18, intermediate pressure section 24 of the steam turbine 18, low pressure section 26 of the steam turbine 18, the generator 28, the transformer 32, the condenser 34 and the like. In yet other embodiments, the nominal turbine or generator or subsystem steady state and transient performance may be recreated and used inside the model predictive control and its estimator (not shown) or an optimizer. Other embodiments may use models with faulted, failed, or sub-optimally operating characteristics in a single or multi-model optimality diagnostic system.

As each component of the power plant 12 is different and may operate at different levels of optimal or sub-optimal conditions, the models should be able to track or adapt themselves to follow such changes. The models should preferably reveal current information about how a particular component is running at a given time, specifically at the time of start-up. This allows the behavior of the power plant 12 to be more accurately predicted, and allows even smaller sub-optimalities of the power plant 12 to be detected. Various parameters and states of the power plant 12 are two areas of the models that can be modified to match the model of the power plant 12 to the current status. A parameter estimator may be used in conjunction with the controller 62 to determine the turbine or generator parameters, and a state estimator may be used to determine the states.

In another embodiment, a state estimator may be used to further aid in tracking the models of the gas turbine 16 or any other system or subsystem or component or the whole power plant 12. The state information may also be used to initialize the model predictive controller 62 at each time interval. Since the model predictive controller 62 can use the estimate of the current state of the turbine or generator to initialize and function correctly. One goal of a state estimator is to estimate the states of the models with the lowest error as compared with the actual system, given the model dynamics. By using the state estimator, which may include information about the dynamics of the power plant 12 and the noise from various sensors, a relatively more accurate value for the actual position can be determined. These same types of results can be applied to a gas turbine 16 or any other system or subsystem or component or the whole power plant 12 in real time during both steady state and transient turbine or generator operation.

There are different methods for the optimizer to adopt depending on the needs of the optimization problem. In one example embodiment, active set methods may be used to solve the quadratic programming formulations. This approach is typically very efficient for relatively smaller problems with lower number of constraints. In another example embodiment, a sequential quadratic programming (SQP) approach may be used, in which the relevant system can be periodically linearized within the prediction horizon to produce a version of problem with fixed, but not necessarily equal realization elements for every step of optimization. The solution of the resulting problem can then be used to re-linearize within the same prediction horizon and the process is repeated for convergence until a satisfactory solution emerges.

In another embodiment, interior point (IP) methods may be used for solving constrained quadratic programming problems arising in model predictive control designs. Typically, the interior point formulations perform relatively fast in the presence of large number of (inequality) constraints. In one such embodiment, at any given step of the iterative process, an interior point algorithm can arrive at a feasible solution within a reasonably short time giving the system an advantage of real time response and control. In another instance, if for some reason the algorithm cannot run to completion, it will produce a control action that may not be optimal, but that may satisfy the constraints. In one such embodiment, there are theoretical bounds for the number of iterations typically used to achieve a solution within any given range of accuracy for every instance of the problem. These bounds typically associate polynomial complexity with the corresponding algorithms, that is, the computational effort to solve quadratic programming problems does not grow faster than polynomially with the problem size. In addition, these theoretical bounds may be well within the solution horizon depending on a number of situational factors. Such factors may typically include the nature of the optimization problem, the system dynamics, the bandwidth of the models, the particular algorithms chosen, the constraints related to the problem and the like. Typically an efficient problem formulation makes the solution amenable to be used in real time and the basic utility of model predictive algorithm may be owing to its ease and appropriateness for being used in real time.

In operation, in all the different alternative model predictive control formulations, the equality constraints in the problem are either used explicitly while solving the optimization problem, or used to eliminate variables so that the resulting quadratic programming formulation have significantly less optimization variables. The typical matrix and vector transformations as part of this elimination of variables may alter the structure in the data of the original problem affecting potential computational savings. The convenience of one formulation over the other however, depends on the specific problem, the quadratic programming algorithm approach used and its ability to exploit a relevant problem structure.

An interior point method is an iterative process that involves taking successive steps until the solutions converge. At each iteration, computational effort can be spent solving linear equations to find a suitable search direction. There are various algorithms that are classified as interior point algorithms, and they may have similar or close to similar performance measures. The use of a particular algorithm is often decided by the scale, accuracy and speed of the solution required.

In one example embodiment, where the state variables and hence the equality constraints are not eliminated, the coefficient matrices used for typical model predictive control formulations may be sparse. This property of sparsity may be utilized to drastically reduce computations. Typically, power plant control problems such as determining input profiles for optimal loading and unloading in real time are highly structured optimization problems in nature. The structure of these optimization problems consists mainly in the sparsity structures in problem data, and can be used to get drastic reductions in computational efforts. There are various levels of sparsity structures that may be deployed to make the solution fast. In one embodiment, sparsity in the optimization problem data is exhaustively exploited to accelerate calculation of the optimal solution and reduce memory requirements.

The objective function in a model predictive control optimization problem may be a mathematical way of defining the goal of the control system. The objective function determines what is defined as optimal. Some general objective functions are to minimize fuel consumption, maximize turbine or generator life, follow reference pressures, minimize time to achieve a predetermined power level, follow reference of pressure ratios, minimize emission of pollutants, follow reference power, follow reference speed, minimize or maximize one or more actuator commands, follow any number of reference flows, minimize costs or the like. In various embodiments, as mentioned earlier, the optimization algorithm used inside the model predictive controller 62 may be constrained or unconstrained.

Model predictive control with estimation can obtain performance and/or operability gains over conventional controls by accounting for component-to-component variation, suboptimal loading or unloading, schedule approximations, and changes in the configuration of the power plant components. For example, performance and/or operability gains can be obtained from some or all of the following: (1) from being nonlinear and MIMO (which yields a coordinated action of a multiplicity of actuators to improve plant operation); (2) from being model-based (which yields lower margin requirements by running to updated model parameters); (3) from its predictive nature (which yields loading paths shaping to improve performance while observing all the constraints); and (4) from its updatable constraints (which enhances operability).

Control systems in typical combined cycle power plants 12 of FIG. 1 that operate in accordance with example embodiments described herein may provide direct control of variables of interest, such as rotor stresses and clearances or the like instead of indirect control of such variables. They explicitly handle constraints without the need for additional, complex logic, and they explicitly deal with the MIMO nature of the detected problem.

Depending on the algorithms used for model predictive control problems, the solution of constrained quadratic programming problems of the form where the realization elements are fixed can be one aspect of model predictive control. In the example embodiments described herein, various software tools can be used for solving constrained quadratic programming problems and implementing model predictive control in controller 62 in an automated real-time, or near real-time fashion. Embodiments of software tools developed for model predictive control implementations may take advantage of the highly-structured problem data in the context of a power plant application to produce efficient codes suitable for fast, real-time or near real-time implementation.

One embodiment of a software implementation can exploit the sparsity structure described above. A sparsity structure that is common to problems may be determinable since it depends only on the problem sizes, like number of constraints and prediction horizon. In operation however, the sparsity structure may be dependent on specific problems and it may be determined automatically during the initialization stage for every problem. To elaborate, the system is linearized during the initialization to calculate the dense realization matrices. At this stage, the size of every entry in the coefficient matrices typically used is compared against a threshold (i.e. about 10-14) to determine if it is zero or non-zero. The sparsity structure found in this manner can then be used throughout the model predictive control method to reduce the computational effort.

Figure 3:
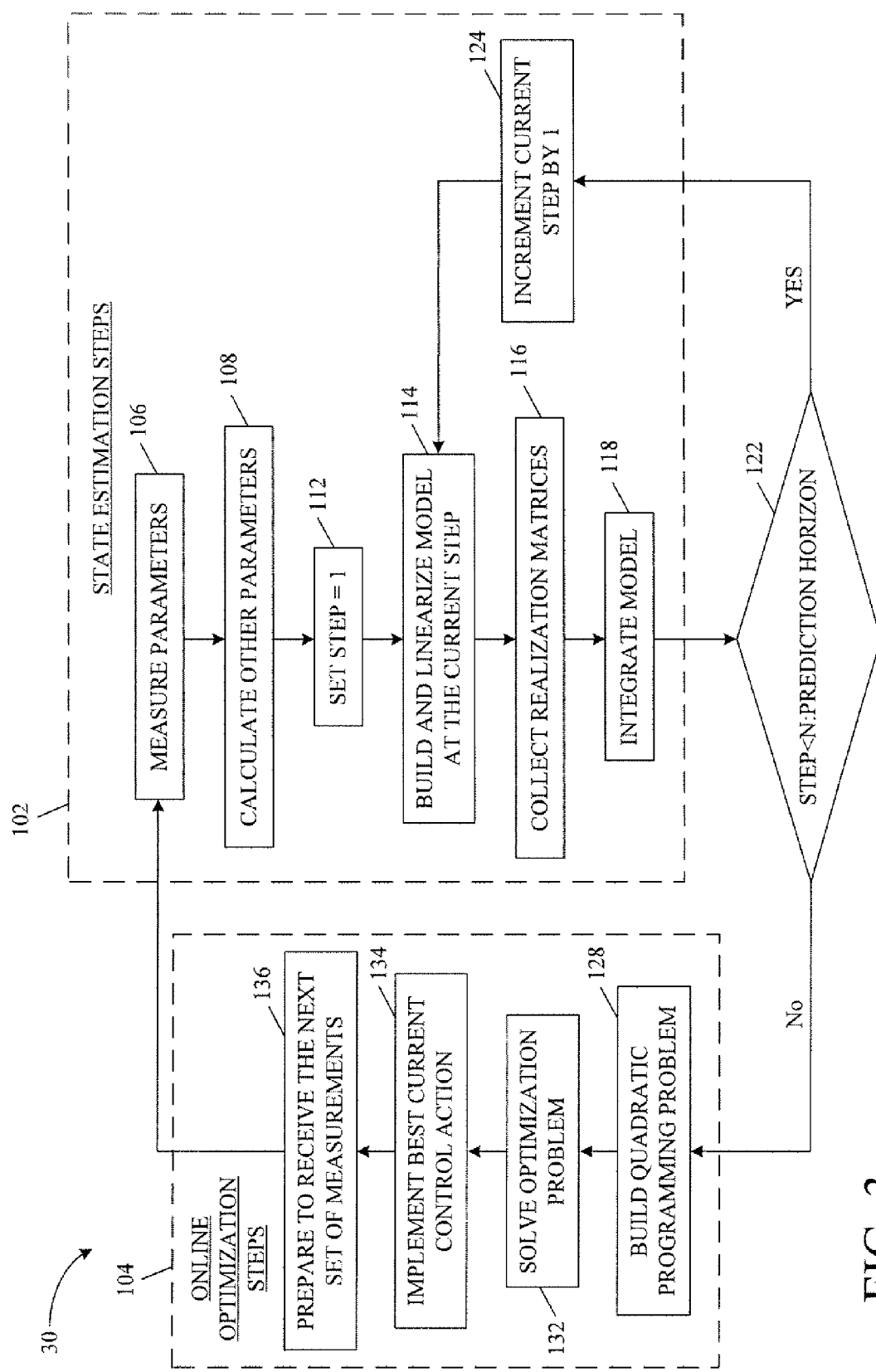
FIG. 3 is a flow chart that shows an exemplary process for improving system controls based on models in a combined cycle power plant in accordance with one embodiment of the invention.

FIG. 3 is a flow chart that shows an exemplary process for improving system controls for loading and unloading of input profiles based at least in part on models in a combined cycle power plant in accordance with one example embodiment of the invention. The method 30 begins with a series of state estimation elements as illustrated in functional block 102. Various operational parameters such as steam and gas temperatures, pressures and flows, fuel and airflow, metal temperatures, actuator position can be measured as shown in functional block 106. Block 106 is followed by 108, in which magnitudes of the parameters that are not easy to be measured directly are calculated. Examples of such parameters may include metal temperatures in steam turbine shells and rotors.

Block 108 is followed by block 112, in which the algorithm equates the current step to 1 and proceeds to build and linearize models that represent dynamics of gas turbine loading and its effects on steam turbine constraints. Block 114 is followed by 116, in which realization matrices are collected to build optimization problems. Block 116 is followed by 118, in which models are further integrated in the optimization problems to predict system state.

Block 118 is followed by decision block 122, in which the algorithm does an internal checking to ascertain whether a step corresponding to the predefined prediction horizon of the optimization problem and enumerated as 'N' has been reached. In case the 'N'th step is reached, the "yes" branch is followed to block 124, in which the current step is incremented by 1. The method 30 continues at block 114 described above for the next iteration.

Referring to block 122, by internal checking if it is ascertained that the 'N'th step is not reached yet, the "no" branch is followed to block 104, in which online optimization functions are performed. In block 104, various online optimization functions can be performed. In block 128, quadratic programming problems can be built with collected realization matrices. Block 128 is followed by 132, in which an online optimizer can solve the optimization problem. Block 132 is followed by block 134, in which a best current control action can be implemented. Block 134 is followed by block 136, in which the optimization program can prepare to receive the next set of measurements. Following block 136, the method 30 continues at block 106 described above for the next iteration.

Referring to FIG. 3 in general, some or all of the control sequences represent a generic set of functional elements typically followed in a large number of situations. In any particular instance, however, a suitable set of control sequences may be determined by converting the optimization problem of the power plant 12 in general as illustrated in the example embodiment of FIG. 3 into a form that the corresponding optimization algorithm is capable of solving. In one embodiment, for instance, typical realization elements may be assumed constant within a prediction horizon, and may be computed in advance the for an overall prediction horizon. In this approximation, the resulting optimization problem is a quadratic programming problem with equality and inequality constraints, rendering itself to an efficient solution. In another embodiment, the optimization problem may be solved using a linear programming method.

The information about the current state of the power plant 12 may comprise information about the turbine or generator itself, a turbine or generator component, an turbine or generator system, a turbine or generator system component, a turbine or generator control system, an turbine or generator control system component, a gas/steam path in the turbine or generator, gas/steam path dynamics, an actuator, an effector, a controlling device that modifies turbine or generator behavior, a sensor, a monitor, a sensing system, a fuel metering system, a fuel delivery system, a lubrication system, a hydraulic system, component-to-component variation, deterioration, a mechanical fault, an electrical fault, a chemical fault, a mechanical failure, an electrical failure, a chemical failure, mechanical damage, electrical damage, chemical damage, a system fault, a system failure, and/or system damage. The models in these systems and methods may comprise a physics-based model, a linear system identification model, a non-linear system identification model, a neural network model, a single or multivariable simplified parameter model, a single input single output model, a multiple input multiple output model, and/or any combinations of these models. Updating may comprise updating, adapting or reconfiguring a state, a variable, a parameter, a quality parameter, a scalar, an adder, a constraint, an objective function, a limit, and/or any adaptable parameter of the models or control during steady state and/or transient operation. Diagnostics occur using heuristic, knowledge-based, model-based approaches, and/or multiple-model hypothesis. The models may be updated/adapted by using a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base or other suitable method. The control command may be determined by constrained or unconstrained optimizations including: linear optimization, nonlinear optimization, convex optimization, non-convex optimization, linear programming, quadratic programming, semi-definite programming, methods that use sparsity structures in problem data to reduce computational effort, and/or gradient decent optimization methods. The operations are preferably performed automatically by a computer or computing device to optimize either the performance and/or the operability of the turbine or generator.

The subject matter described herein is not limited to only the above-mentioned functions of the controller 62 such as optimizing loading and unloading input profiles during start-up of the power plant 12. In other example embodiments, the functions of the controller 62 may include other real time operations such as prediction, detection and prevention of any level of deterioration, faults, failures or damage in various systems, subsystems and components of the power plant 12. In another instance, the real time execution rate of the controller 62 is configurable to adapt to different sizes of the models. In another instance, the real time execution rate of the controller 62 is also configurable to adapt to various other of optimization algorithms.

In another embodiment of the system, instead of directly controlling and monitoring various systems, subsystems and components of the power plant 12, the controller 62 may communicate with a number of local controllers and processor installed in various systems, subsystems and components of the power plant 12. Examples of such local controllers and processor may include, but are not limited to, a gas turbine controller, a steam turbine controller, a heat recovery system generator controller, a standalone processor communicating with the gas turbine controller, a standalone processor communicating with the steam turbine controller, or a standalone processor communicating with the heat recovery system generator controller.

In yet another example embodiment of the invention, the power plant 12 may be a fossil plant or a nuclear plant. Regardless of the configuration of the power plant 12, typically, steam turbine plants, either from combined cycle power plants or nuclear plants or fossil plants, may be subject to stress constraints of the rotor. Such stress constraints may come typically at the rotor bore and at the rotor surface, differential expansion constraints in the direction of the axis of the rotor to prevent axial rubs, and radial clearance constraints to prevent radial rubs due to differential expansion in the direction perpendicular to the rotor. Typical operations of nuclear and fossil plants may also be subject to similar constraints in maintaining the water level of steam generators. In addition, fossil plants must also account for emission constraints. Other constraints specific to fossil plants may include temperature limitations to prevent slag formation or slag build-up. For a typical estimation problem in fossil plants, online fuel composition or quality estimation may be needed as well as an indication of the level of slagging and fouling in the furnace tubes, which may largely affect the heat transfer to the water/steam tubes. The objective function applicable in case of fossil or nuclear plants may be similar to the ones applicable for combined cycle power plants. In an exemplary embodiment, control actions for fossil plants may include measures such as total fuel flow, total air flow or fuel/air ratio, individual fuel and airflows at individual burners or at a set of burners and the like. In another instance, specifically in the context of a nuclear power plant, there may be a steam quality limitation to prevent or minimize erosion.

Neural Network Modeling of Turbine Components

In one example embodiment, a neural network model may be used to model expansion of turbine components so as to allow predicting the differential expansion of turbine components and to advantageously control clearances between turbine components during operation. Shortened start-up times, or accelerated loading, without exceeding mechanical limits on turbine component clearances may be achieved, at least in part, through the use of systems and methods that incorporate neural network models to predict turbine component expansion. More specifically, embodiments of the invention can provide systems and methods that receive operating parameters indicating the states of one or more turbine components, such as the rotor and the shell, and apply those operating parameters as inputs to a neural network model, which in turn is able to model and predict expansion rates of those components. Accordingly, predicting the expansion rates may allow a turbine control system to respond appropriately so as to operate the turbine in its most efficient state. For example, a turbine may be operated with faster loading times and longer high load operating periods, without undue risk of turbine malfunction resulting from rubbing components. Various outputs of the neural network model, as described more fully below, such as shell expansion, rotor expansion, and/or differential expansion, may act as input parameters to the model predictive control system, described above.

Figure 4:
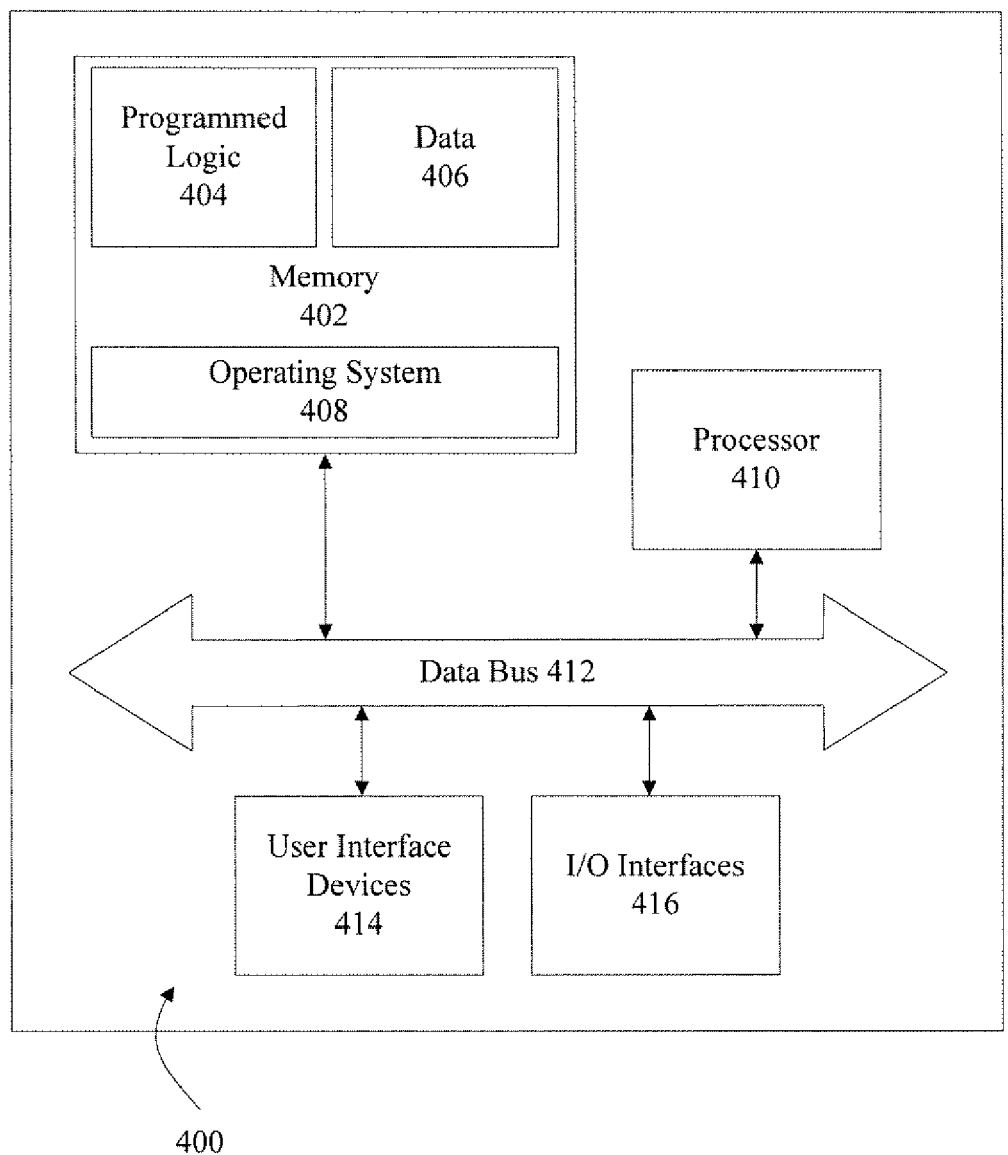
FIG. 4 is an example schematic diagram of a controller in accordance with embodiments of the invention.

FIG. 4 illustrates a block diagram of an example controller 400 used to implement an example neural network model, according to an embodiment of the invention. The controller 400 may be the controller 36, as described above in reference to FIGS. 1-3, or a component thereof, or, alternatively, the controller may be another controller that performs some or all of the functions as described above in reference to FIGS. 1-3 and/or FIGS. 4-9 below. The controller 400 may include a memory 402 that stores programmed logic 404 (e.g., software) and may store data 406, such as sensed operating parameters, model representations, cost functions, training data, or the like. The memory 402 also may include an operating system 408. A processor 410 may utilize the operating system 408 to execute the programmed logic 404, and in doing so, also may utilize the data 406. A data bus 412 may provide communication between the memory 402 and the processor 410. Users may interface with the controller 400 via a user interface device(s) 414 such as a keyboard, mouse, control panel, or any other devices capable of communicating data to and from the controller 400. The controller 400 may be in communication with one or both of the steam turbine 18 or the gas turbine 16, via an I/O interface 416. The I/O interface 416 may communicate with the turbines, turbine components, or other components of the power plant through via the I/O interface which may in turn communicate with the communication lines, for example the communication lines 44, 46, 48, and 52 for communicating with the gas turbine 16 and the steam turbine 18. More specifically, one or more of the controllers 400 may carry out the execution of the neural network modeling, such as, but not limited to, determining operational parameters, which may be from one or more turbine sensors, applying parameters as inputs to the neural network model, model expansion of one or more turbine components, generating a control action based at least in part on the expansion, and training the neural network model. Furthermore, the one or more controllers 400, may further carry out the execution of other modeling tools and implement control logic, as are known in turbine control systems. Additionally, the neural network models described herein may be one component of a larger control system containing other control logic, such as other modeling tools, like the predictive model control disclosed above. In the illustrated embodiment, the controller 400 may be located remotely with respect to the turbine 18; although, it may be co-located or even integrated with the turbine 18. Further the controller 400 and the programmed logic 404 implemented thereby may include software, hardware, firmware, or any combination thereof, which may be configured to operate in any manner described herein. It should also be appreciated that multiple controllers 400 may be used, whereby different features described herein may be executed on one or more different controllers 400.

Figure 5:
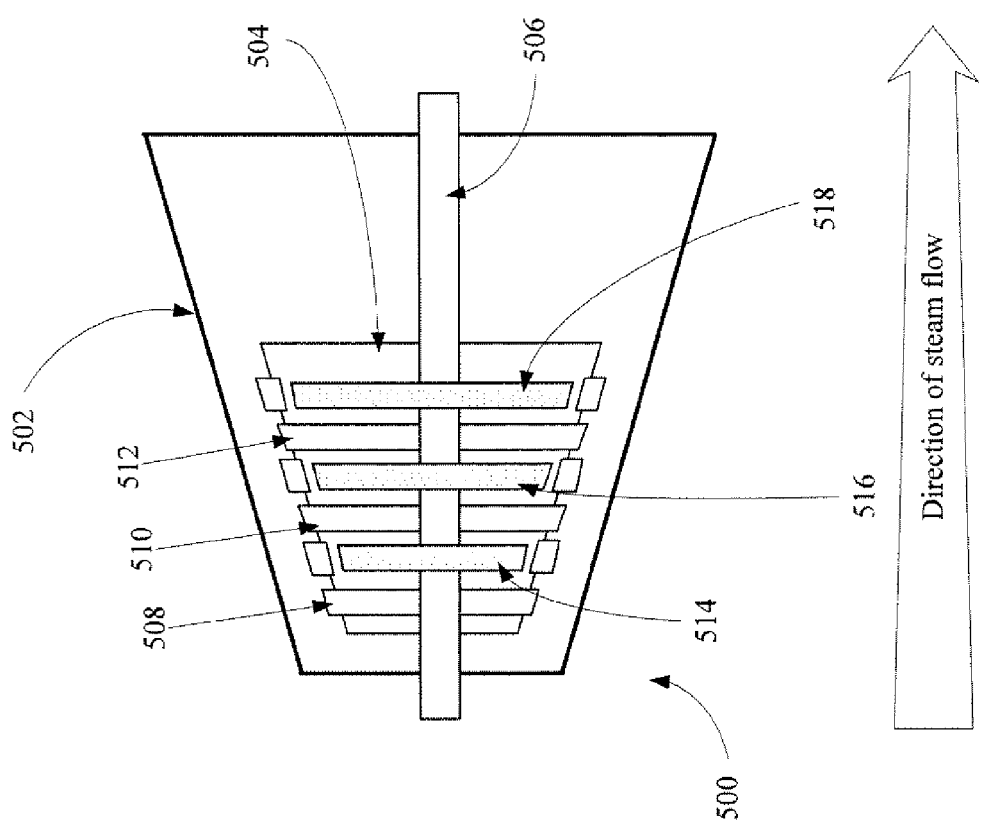
FIG. 5 is an example schematic diagram of a turbine in accordance with embodiments of the invention.

FIG. 5 is a cross-sectional diagram of an example turbine 500 that may be used with a controller, such as controller 400 in FIG. 4, in accordance with an embodiment of the invention. The turbine 500 as referenced herein may be a steam turbine 18, like that more fully described in reference to FIG. 1 above. However, it is also appreciated that, alternatively, a gas turbine, such as the gas turbine 16, may also be used in accordance with a controller, such as 400, in an embodiment of the invention. As shown in FIG. 5, the turbine 500 can include a turbine casing or turbine shell 502. The turbine shell 502 can enclose major parts, such as a turbine section 504, of the turbine 500. The turbine section 504 may include a shaft 506 and a plurality of sets of rotating and stationary turbine blades. In operation, the expanding hot gases from a combustor, for example the combustor 14 as described above in reference to FIG. 1, may be directed by the stationary turbine blades, which are also referred to as stators or nozzles 508, 510, 512, and may drive the rotating turbine blades or rotor blades 514, 516, 518. The nozzles 508, 510, 512 may be affixed to the interior surface of the turbine shell 502 and may extend inwardly into the turbine 500. Additionally, the shaft 506 and rotor blades 514, 516, 518 may be collectively referred to as a rotor assembly. The turbine 500 of FIG. 5 shows three sets of nozzles and rotor blades; however, it is appreciated by those having skill in the art that any number of sets of nozzles and rotor blades may be present in a turbine 500 used in accordance with an aspect of the invention.

It will further be understood that each set of nozzles and rotor blades may be referred to as a stage of the turbine 500. For example, as shown in FIG. 5, the first nozzle 508 and rotor blade 514 may be referred to as the first stage of the turbine 500; the second nozzle 510 and rotor blade 516 may be referred to as the second stage of the turbine 500; and the third nozzle 512 and rotor blade 518 may be referred to as the third stage of the turbine 500. A turbine 500 used in accordance with an embodiment of the invention may include any number of stages.

It will also be understood that in some embodiments, the rotor blades 514, 516, 518 may be referred to as buckets. Alternatively, the term bucket may be used to describe both the exposed portion of a blade extending from the shaft 506 and the portion of the blade extending into the shaft 506. In such a situation, the term rotor blade may be used to describe the exposed portion of the bucket. For the purposes of this disclosure, the term bucket may be used to refer to an entire blade including both the exposed portion of a blade and the portion of a blade extending into the shaft 506, or the blade shaft portion. The term rotor blade may be used to refer to the exposed portion of a blade or bucket. The bucket tip and the rotor blade tip may be used as interchangeable terms referring to the same component.

The operation of the turbine may be measured by several sensors detecting various observable conditions of the turbine and the ambient environment. In many instances, multiple redundant sensors may measure the same measured condition. For example, one or more sensors may be in communication with and monitor the temperature of turbine components, such as, for example, the turbine shell 502. Similarly, temperature sensors may monitor ambient temperature surrounding the turbine, compressor discharge temperature, turbine exhaust temperature, other related temperature measurements of the gas stream through a gas turbine, or other turbine parameters as are known in the art. As used herein, "parameters" refer to items that can be used to define the operating conditions of the turbine, such as temperatures, pressures, and gas flows at defined locations in the turbine. The sensors described may be in communication with one or more components of the turbine 500 as is known in the art. For example, in a steam turbine, pressure and temperature sensors may be integrated at the inlet and discharge points of the turbine 500 to measure the inlet and discharge steam conditions. In some example turbine applications, such as steam turbines, an additional sensor or sensors for directly measuring the expansion of the rotor and/or the shell metal components may be integrated at either the inlet point, the discharge point, or both. In any instance, some or all of the sensors can be in communication with the controller, such as controller 400, by way of communication lines or any other device or method.

Figure 6:
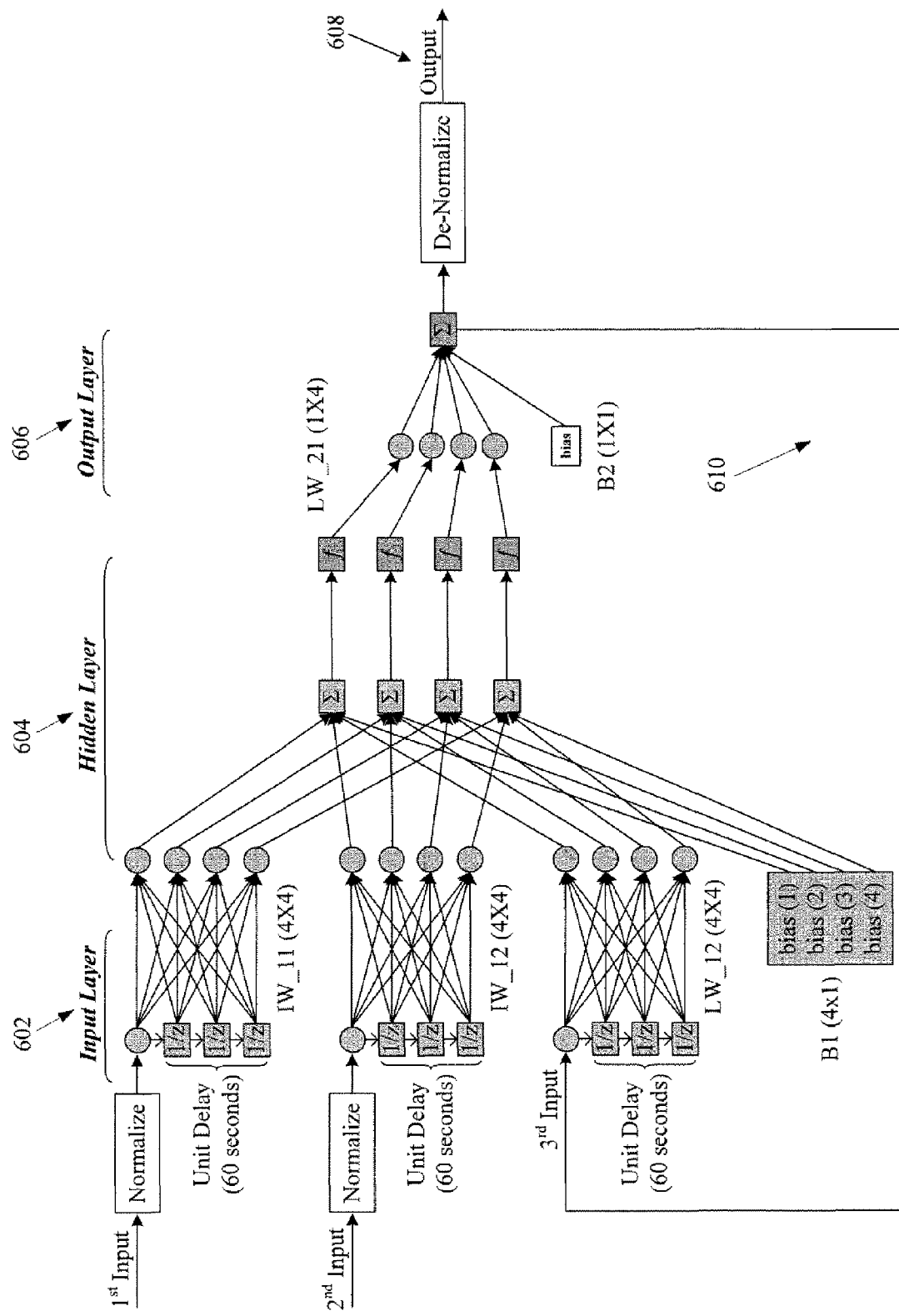
FIG. 6 is an example diagram of a neural network model executed by embodiments of the invention.

FIG. 6 illustrates an example embodiment of a neural network model 600 as described herein and as may be executed by the controller in accordance with the embodiments of the invention described herein. The neural network model 600 may be any type of artificial neural network model as is known in the art, such as, for example, a feedforward neural network, a single-layer perceptron, a multi-layer perceptron, a radial basis function network, a recurrent neural network, a modular neural network, or the like as is known in the art. The neural network 600 may include one or more nodes or groups of nodes much like that of the human brain. Generally, the neural network 600 is an estimator, modeler, or predictor that can be designed and trained to map a selected range of input signal or signals so as to generate a desired output parameter or parameters that varies in correspondence with the input signal or signals. In example embodiments further described herein, there may exist more than one neural network model 600, each for modeling or predicting a certain output parameter, as is desired to be known for modeling the differential expansion occurring within a turbine. For example, there may be two neural network models 600, whereby the first neural network model 600 configured to model or predict the shell expansion, and a second neural network model 600 is configured to model or predict the rotor assembly expansion. Alternatively, it is appreciated that a single neural network 600 may be configured to receive multiple inputs so as to model or predict differential expansion directly as the output from the single neural network 600.

More specifically, in one embodiment, each neural network model 600 can include at least three groups of neurons or nodes in an input neuron layer 602, at least one hidden neuron layer 604, and an output neuron layer 606. Each of these layers may also be interchangeably referred to herein as neurons. The input neuron layer 602 may take as inputs, for example, shell temperature as measured by the one or more sensors described above, and/or modeled parameters as inputs to determine rotor expansion. It is appreciated, as described more fully in reference to FIG. 8 below, that some parameters may not practically be modeled in a turbine environment, and may be better predicted or modeled using a mathematical model. Accordingly, the neural network models 600, as described herein, may take as inputs operating parameters that are capable of direct measurement and/or modeled parameters that represent operating parameters for which direct measurement cannot be done or is impractical. Optionally, the inputs may be normalized or subject to numerical sealing operations, as is known in the art.

In one example embodiment, the hidden neuron layer 604 may be configured to implement feedforward logic, whereby the signals are calculated and input "forward" to the next node without implementing backward or lateral communication between nodes. The hidden neuron layer 604 nodes may be made up of one or more equations as are known in the art. Certain examples illustrated in FIG. 6 illustrate a series of summation functions summing the vector inputs of the input layer feeding into a hyperbolic tangent function (e.g., y=tanh (u)). However, it is appreciated that other equations may be used as are known for solving for neural network layer parameters. In alternate embodiments, the hidden neuron layer 604 of the neural network or networks may be configured as a recurrent network, having additional feedback connections between neuron layers and/or lateral feedback connections between neurons within in a single layer.

The resultants of the operations performed by the hidden neuron layer 604 are fed as inputs to the output neuron layer 606. The output neuron layer may include one or more resultant outputs. The outputs may then be summed by a summation function to provide the desired output 608, for example, the expansion of one or more of the rotors, the expansion of the turbine shell, or the differential expansion of the rotor in comparison to the turbine shell. Furthermore, the outputs of the output neuron layer 606 may optionally be subject to a de-normalizing operation or numerical scaling operation, as is known in the art. In one example embodiment, as further illustrated and described in FIG. 8, one neural network model may predict the shell expansion and another neural network model may predict the rotor expansion. In this embodiment, the shell expansion and rotor expansion outputs are compared, typically by an addition or subtraction function, to determine the differential expansion. The differential expansion may then be used, at least in part, to generate a control action or perform on operation on other control actions during turbine operation.

Additionally, in one example, the output neuron layer 606 may be fed as a feedback signal 610 back to the input neuron layer 602 as a third input. While FIG. 6 illustrates an example simple feedback signal 610 feeding directly into the input neuron layer 602, the feedback signal 610 may optionally be subject to other operations. For example, the feedback signal 610 may optionally be fed through a unit delay prior to being fed as an input to the input neuron layer 602. Additionally, a bias means may optionally be coupled to one or more of the layers of the neural network 600 to allow for adjusting either the weighting or the internal parameterization of the one or more layers. The bias means may be, for example, a power supply providing a stable, variable, and determinable power source that allow adjusting the weighting functions and/or internal parameterizations of the various hidden layers.

The design (also referred to as the "selection") of the neural network model 600, including the input neuron layer 602, the mapping of the measured and/or modeled operating parameters to the input neuron layer 602, each hidden neuron layer 604, and the output neuron layer 606, may be constructed using computing and modeling software applications, such as MATLAB by The MathWorks, Inc. of Natick, Mass., or the like. The computing and modeling software application may provide a graphical interface for building, testing, and/or training each neural network model 600 prior to implementation into the controller 400 in accordance with embodiments of the invention.

Figure 7:
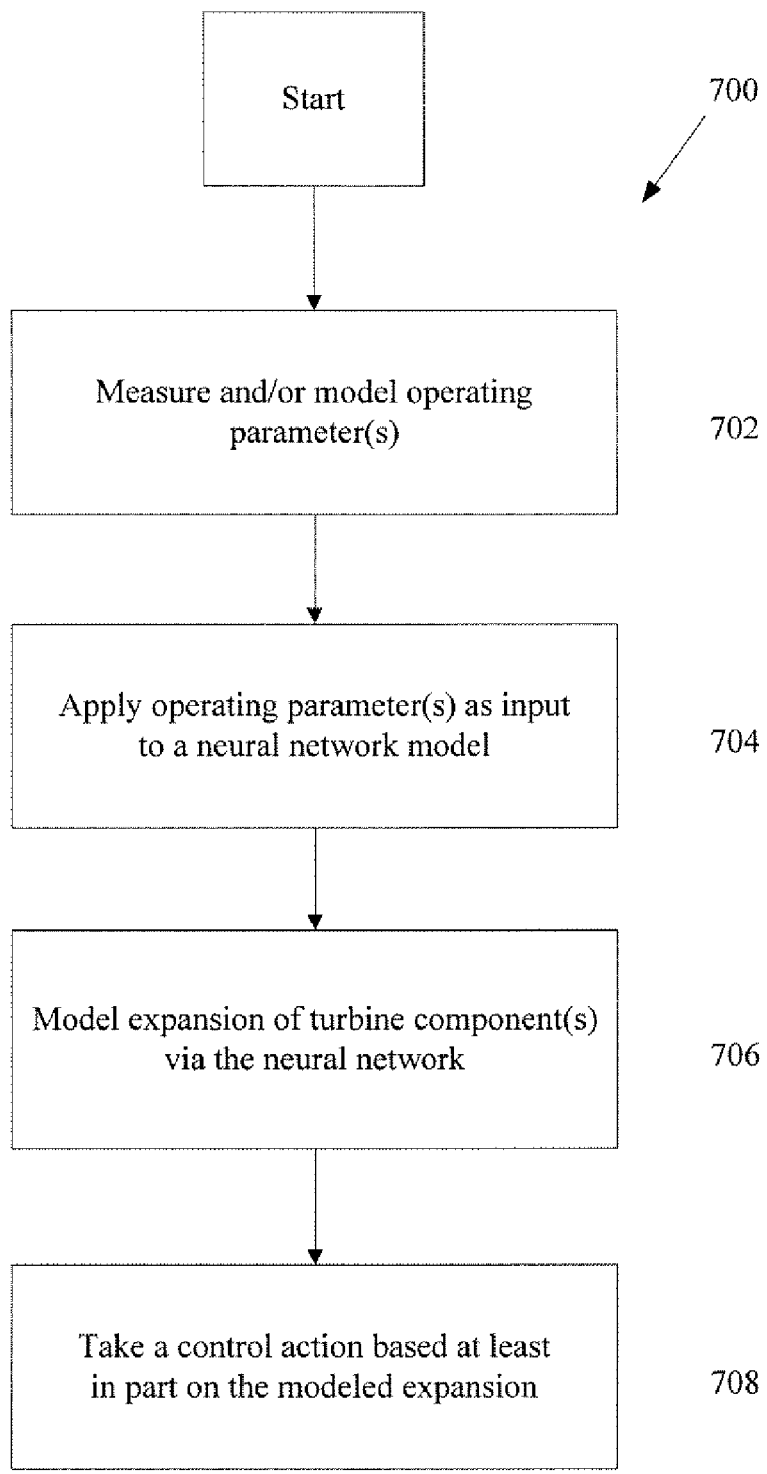
FIG. 7 is a flow chart illustrating an example process for incorporating a neural network model of components into a turbine control system in accordance with embodiments of the invention.

FIG. 7 illustrates an example method in accordance with an embodiment of the invention. Provided is an example method 700 of the basic operation of neural network model, which may be executed by the controller 400, used to model expansion of turbine components and predict differential expansion of turbine components during operation of a turbine, for example the turbine 500.

At functional block 702, the controller 400 may receive one or more operating parameters indicating the operating states of the turbine 500. Measured operating parameters may include, but are not limited to, shell temperature, ambient temperatures, turbine rotational speed, and turbine pressures. It is also appreciated that other parameters that may not be measured may be modeled based on other measured parameters. Further, one or more of the measured parameters may also be modeled to increase accuracy and system redundancies. In one example embodiment, the rotor temperature may be modeled by measuring the steam temperature at certain points during turbine operation, and applying the measured steam temperatures as inputs to a model that predicts rotor temperature, based on known or derived thermal models.

At functional block 704, the operating parameters measured and/or modeled at functional block 702 may be applied as inputs to one or more neural network models. At functional block 706 the neural network model may model the expansion of one or more of the turbine components in accordance with the description of FIG. 6 above and the following FIG. 8. The differential expansion may compare, for example, the expansion of the turbine shell to the expansion of the rotors, and can be generally stated as: Differential expansion=Rotor expansion−Shell expansion. It is appreciated that in other embodiments, the differential expansion may be modeled to compare expansion between other turbine components, as are known in the art. While FIG. 7 generally illustrates an embodiment during operation, it is appreciated that the neural network model must be selected (or designed) and, subsequently, trained prior to supplying inputs during operation. Example neural network selection and training processes are described below with respect to FIG. 9.

At functional block 708, the controller 400 may perform a control action based at least in part on the modeled expansion determined at functional block 706. The control action may be to adjust the operation of the turbine by means known in the art, such as, for example, adjusting the valves or the loading rate. For example, the control action may generate a signal to increase the speed of the turbine if the modeled differential expansion is under a certain predefined threshold, and decrease the speed of the turbine if the modeled differential expansion is above a certain predefined threshold. It is appreciated that the predefined thresholds are specific to the size and intended operation of the turbine. Thus, one can identify values for these example predefined thresholds based on the individual turbine application. Alternatively, the control action may be to halt the operation of the turbine or a component of the turbine, to trigger an alarm, or to transmit a user notification message. Further, the control action may take into consideration other aspects of the turbine operation such as other operating parameters, the current operating rate, the loading stage of the turbine, and the like. Additionally, the controller 400 may have certain set points or thresholds identifying ranges within which the differential expansion may exist before generating a control action to alter either the turbine operation or the expansion of the turbine components. It is further appreciated that the modeled output of functional block 706 may act as an input to the model predictive control system, as more fully described above in reference to FIGS. 1-3, and that the control action at functional block 708 may be in response to the control actions of the model predictive control system.

Figure 8:
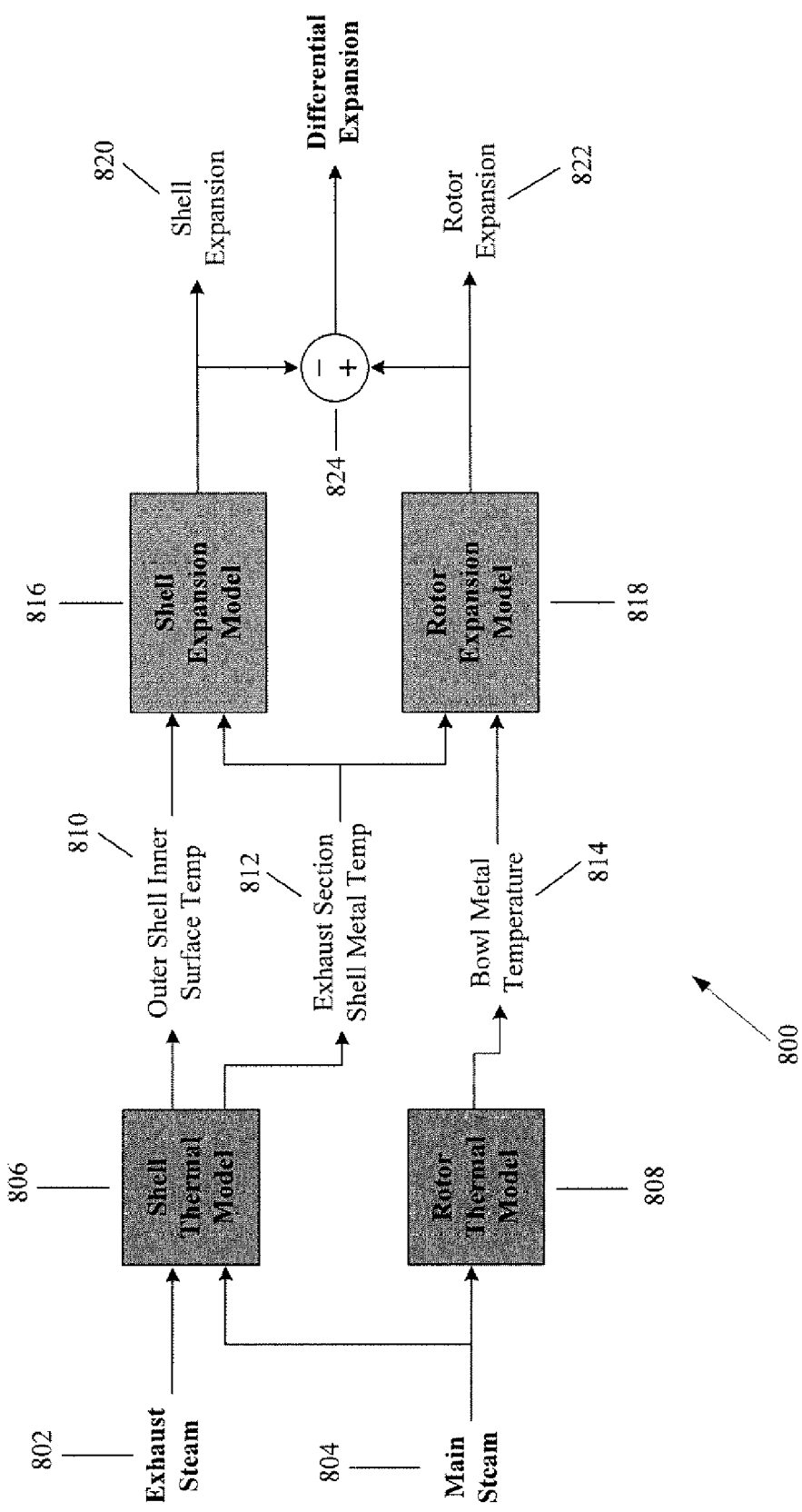
FIG. 8 is a functional block diagram illustrating an example arrangement of a neural network model of components for prediction of turbine axial clearance in accordance with embodiments of the invention.

FIG. 8 illustrates a functional example method 800 by which an embodiment may operate, performed by the controller 400, to model or predict the differential expansion of turbine components. At input 802 and input 804, exhaust steam temperature and main steam temperature, respectively, may be measured. It may be necessary to model certain parameters rather than measure them directly, because, in some examples, measurements can not be directly obtained. For example, in a steam turbine, it may be difficult or impractical to measure the temperature of rotating components and the internal surfaces. Accordingly, other parameters, such as steam temperature, which are capable of direct measurements may be applied to one or more models to then estimate the desired parameter. The models may be simplified, one-dimensional, lumped models (also known as lumped component models). Example lumped component models may be also be referred to as algebraic equations or differential equations. Alternatively, the parameter models may be realized by a computerized collection of algebraic or finite difference equations.

Blocks 806 and 808 represent simplified models in this example embodiment. Block 806 represents a shell thermal model, whereby the exhaust steam temperature input 802 and the main steam temperature input 804 are supplied as inputs to the shell thermal model. The shell thermal model may model the outer shell inner surface temperature and the exhaust section shell metal temperature, indicated as outputs 810 and 812, respectively. Similarly, at block 808, a rotor thermal model may take main steam as an input 804 and model bowl metal temperature, as shown by output 814. It is appreciated that FIG. 8 provides only an example embodiment, and that other components may be modeled, using different inputs. For example, an alternative embodiment may take as inputs the main steam temperature, or the main steam temperature and the exhaust steam temperature, and model via a neural network model the shell expansion and the rotor expansion, individually, or directly model the differential expansion.

Blocks 816 and 818 illustrate two neural network models that may be used to model the shell expansion and the rotor expansion, respectively, as described in reference to FIG. 6. Again, it is appreciated that the neural network models, such as illustrated at blocks 816 and 818 in this figure, are to be selected, designed, and trained. Selection and training is more fully described below in reference to FIG. 9.

The output from the neural network models, which may be illustrated in this example by outputs 820 and 822, may then be compared, using a comparator or any similar operation to determine the differences between the outputs (shown by comparator 824). Comparing and/or determining the differences between the shell expansion output 820 and the rotor expansion output 822 results in the differential expansion of the turbine, particularly comparing the axial clearance of the turbine blades in relation to the turbine shell, operating in the then existing environment. The differential expansion output may be modeled over time, and the results may be analyzed over time to determine the effect the current and/or historical operating conditions have on the components of the turbine. For example, in certain operating states, such as cold starts, it may be beneficial to model (or predict) the differential expansion over time while loading the turbine, so as to provide a better understanding of the limits of the components. Modeling the differential expansion also provides a more complete picture of the conditions of the turbine components during varied operating states, allowing an operator and/or control system to operate the turbine at its most efficient state, while avoiding the risk of component failure due to rubbing, or similar conditions.

Figure 9:
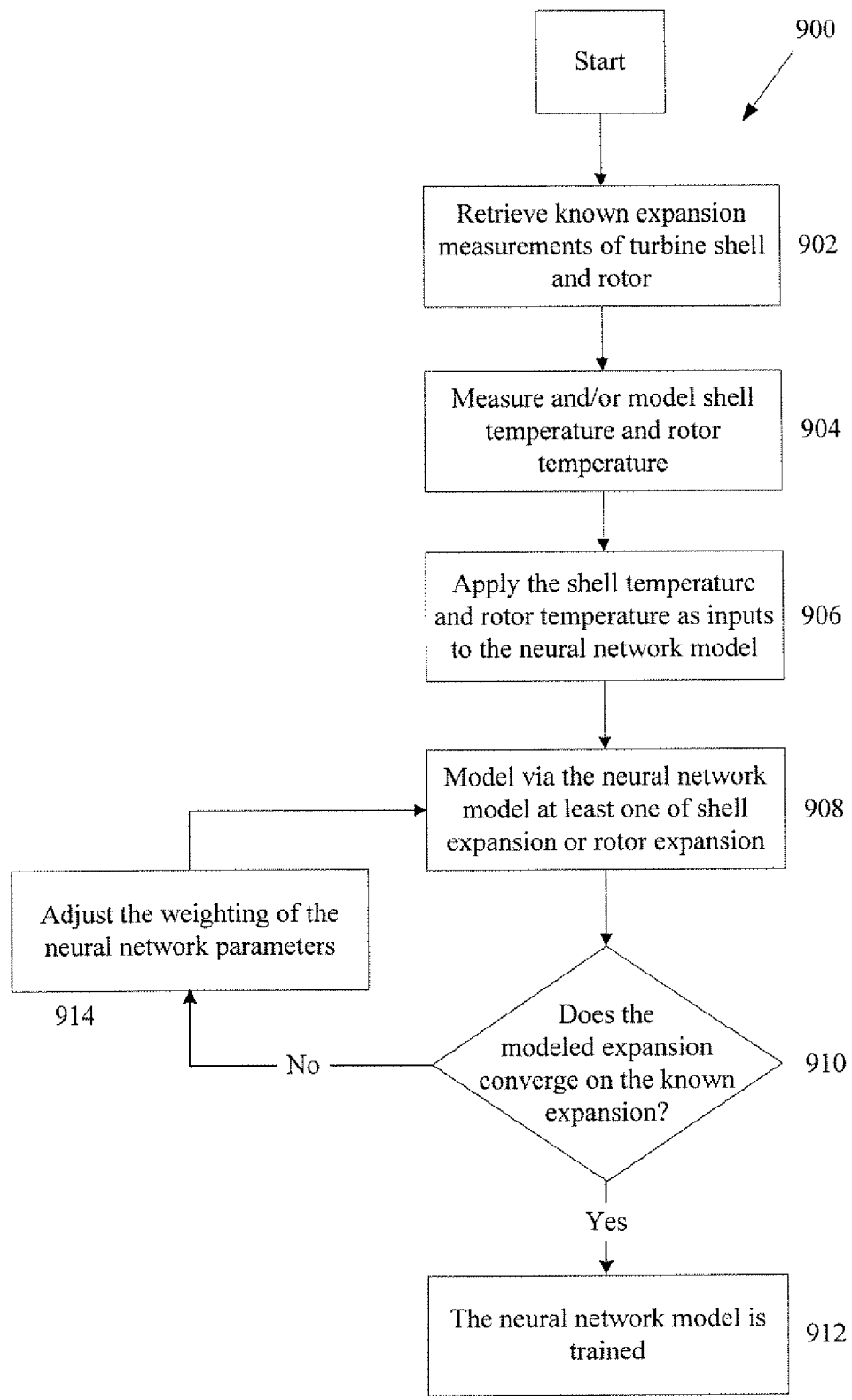
FIG. 9 is a flow chart illustrating an example process for executing a neural network model of components in a steam turbine application in accordance with embodiments of the invention.

FIG. 9 illustrates an example method 900 by which an embodiment of the invention may operate to train each neural network model 600 for implementation as described in reference to FIGS. 6-8. The neural network model 600 may be trained so as to determine the best representative function or functions executed by the hidden neuron layer 604 and the best nodal weighting for generating a relatively accurate output in response to the measured operating parameter input signals. A learning algorithm or algorithms may be used during training to generate the appropriate weighting factors for one or more of the nodes of the neural network. Further, the learning algorithm may be used to determine the appropriate bias signals to apply to one or more of the network layers. The learning algorithm may be executed in an iterative manner until the error factor comparing the output of the neural network to known, correct observations or training data is minimized or converges. This process may also be referred to as optimization of the neural network model 600. Examples of learning algorithms performed during optimization may be a means-squared error algorithm, a backpropagation algorithm, a Levenberg-Marquardt algorithm, or other statistical methods utilizing error functions known in the art.

First, known values of turbine component expansion are retrieved to provide training data or target data against which the neural network model 600 is optimized during training, as shown at functional block 902. Like at functional block 702 of FIG. 7, turbine component operating parameters are measured or modeled at functional block 904 and applied as inputs to the neural network model 600 at functional block 906. The inputs from functional block 906 are operated on by the hidden neuron layer functions, as described in reference to FIG. 6 above, to determine outputs, such as rotor expansion, shell expansion, or differential expansion, at functional block 908. Functional block 910 provides for comparing the modeled expansion from functional block 908 to the known turbine component expansion retrieved at functional block 902. The comparison may be performed using a training algorithm to perform an error function operation on the output in comparison to the known data, as discussed above. If the error term determined at functional block 910 is sufficiently minimized, so as to prove convergence of the modeled outputs with the known outputs, the neural network model may be considered trained and no further adjustments to the weighting and parameters need to be performed, as illustrated at functional block 912. However, if the error term determined at functional block 910 does not indicate satisfactory convergence, the weighting of one or more of the parameters of one or more of the hidden layers may be adjusted, as illustrated at functional block 914. After adjusting the input neuron layer and/or the hidden neuron layer, the neural network model is executed again, as at functional block 908 to generate model expansion outputs. The elements illustrated at functional blocks 908, 910, and 914 are repeated iteratively, making minor adjustments to the weighting and hidden neuron layers, until the determinations made at functional block 910 show satisfactory convergence between the modeled expansion outputs and the known expansion data. It is further appreciated that in addition to, or in the alternative, biasing signals applied to one or more nodes of any of the network layers may be adjusted like the adjustments made at functional block 914.

The terminology used herein is for the purpose of description, not limitation. Specific structural and functional details disclosed herein are not to be interpreted as limiting, but merely as a basis for the claims as a representative basis for teaching example embodiments of the invention. Any modifications or variations in the depicted model predictive control systems and methods, and such further applications of the principles as illustrated herein are considered to be within the scope of this invention.

The example embodiments reference block diagrams of systems, methods, apparatuses, and computer program products according to at least one embodiment described herein. It will be understood that each block of the block diagrams, and combinations of blocks in the block diagrams, respectively, can be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of each block of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide elements for implementing the functions specified in the block or blocks.

The systems and methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Accordingly, providing for systems and methods as described herein allows for more flexible control and greater operating efficiencies of turbine and plant operations. Furthermore, providing for a neural network to model and thus predict the differential expansion of turbine components during operation allows for operating the turbine in its most efficient state as soon as possible by pushing the turbine loading and/or unloading rates to their limits during start-up, while operating within predefined limits and safe operating zones. Additionally, the neural network model may be but a single component in the larger online-optimizer performing a real time model predictive optimization of the start-up and operating profiles of a turbine or a turbine operating in a combined cycle power plant.

It should be apparent that the foregoing relates to various embodiments of the invention and that numerous changes and modifications may be made herein by one of ordinary skill in the art without departing from the general scope defined by the following claims.

We claim:

1. A method for controlling clearance in a turbine, the method comprising:
    applying at least one operating parameter as an input to at least one neural network model;
    modeling via the at least one neural network model thermal expansion of at least one turbine component; and
    implementing a control action based at least in part on the modeled thermal expansion of the at least one turbine component.

2. The method in claim 1, further comprising:
    determining an outer shell temperature associated with the turbine; and
    determining a rotor temperature associated with the turbine;
    wherein the at least one operating parameter comprises the outer shell temperature and the rotor temperature.

3. The method in claim 2, wherein determining the outer shell temperature comprises measuring the outer shell temperature.

4. The method in claim 2, wherein determining the rotor temperature comprises modeling the rotor temperature.

5. The method in claim 4, wherein modeling the rotor temperature comprises:
    obtaining steam temperature from at least one point in the turbine;
    applying the steam temperature to a rotor thermal model; and
    modeling via the rotor thermal model a rotor temperature parameter.

6. The method in claim 1, wherein modeling via the at least one neural network model thermal expansion of the at least one turbine component comprises:
    modeling thermal expansion of a shell associated with the turbine; and
    modeling thermal expansion of a rotor associated with the turbine.

7. The method in claim 6, further comprising determining a differential expansion based at least in part on the difference between the modeled rotor thermal expansion and the modeled shell thermal expansion.

8. The method in claim 1, further comprising applying the modeled thermal expansion of the at least one turbine component as a feedback input to the at least one neural network model.

9. The method in claim 1, wherein implementing the control action comprises at least one of halting operation of the turbine, adjusting operation of the turbine, triggering an alarm, transmitting a notification message, or altering the clearance of the turbine.

10. The method in claim 9, wherein adjusting the turbine comprises increasing the speed of the turbine if the modeled thermal expansion of the at least one turbine component is within a predefined threshold, and decreasing the speed of the turbine if the modeled thermal expansion of the at least one turbine component is outside of the predefined threshold.

11. The method in claim 1, wherein implementing the control action comprises applying the modeled thermal expansion of the at least one turbine component as an input to a predictive model control for controlling a power plant of which the turbine is a part.

12. A system for controlling a turbine, the system comprising a controller operable to:
    determine at least one operating parameter;
    apply the at least one operating parameter as an input to at least one neural network model;
    model via the at least one neural network model thermal expansion of at least one turbine component; and
    generate a control action based at least in part on the modeled thermal expansion of the at least one turbine component.

13. The system in claim 12, wherein the controller is further operable to:
    determine an outer shell temperature associated with the turbine; and
    determine a rotor temperature associated with the turbine;
    wherein the at least one operating parameter comprises the outer shell temperature and the rotor temperature.

14. The system in claim 13, further comprising at least one sensor in communication with the turbine and the controller, wherein:
    the at least one sensor comprises at least one shell temperature sensor and at least one steam temperature sensor;
    the controller is further operable to determine the outer shell temperature by receiving an outer shell temperature from the at least one shell temperature sensor;
    the controller is further operable to obtain a steam temperature from at least one point in the turbine; and
    the controller is further operable to determine the rotor temperature by modeling the rotor temperature from a received steam temperature.

15. The system in claim 12, wherein the controller is further operable to:
    model via the at least one neural network model a shell thermal expansion associated with the turbine;
    model via the at least one neural network model a rotor thermal expansion associated with the turbine; and
    determine a differential expansion based at least in part on the difference between the modeled rotor thermal expansion and the modeled shell thermal expansion.

16. The system in claim 12, wherein the controller is further configured to apply the modeled thermal expansion of the at least one turbine component as a feedback input to the at least one neural network model.

17. A method for modeling turbine clearance, the method comprising:
    sensing a first and a second operating parameter;
    modeling at least one shell temperature parameter based at least in part on the first sensed operating parameter;
    modeling at least one rotor temperature parameter based at least in part on the second sensed operating parameter;
    determining a shell thermal expansion by applying the at least one shell temperature parameter as an input to a shell expansion neural network model;
    determining a rotor thermal expansion by applying the at least one rotor temperature parameter as an input to a rotor expansion neural network model; and determining a differential expansion based at least in part on the difference between the rotor thermal expansion and the shell thermal expansion.

18. The method in claim 17, wherein:

the first operating parameter comprises exhaust steam temperature; and the second operating parameter comprises main steam temperature.

19. The method in claim 18, wherein the modeling of the at least one shell temperature parameter comprises:

applying the first and the second operating parameters as inputs to the shell thermal model; and modeling an outer shell inner surface temperature and an exhaust section shell metal temperature via the shell thermal model, wherein the outer shell inner surface temperature and an exhaust section shell metal temperature comprise the at least one shell temperature parameter; and wherein the outer shell inner surface temperature and the exhaust section shell metal temperature are applied as inputs to the shell expansion neural network model.

20. The method in claim 19, wherein the modeling of the at least one rotor temperature parameter comprises:

applying the first operating parameter as an input to a rotor thermal model; and modeling a bowl metal temperature via the rotor thermal model, wherein the bowl metal temperature comprises the at least one rotor temperature parameter; and wherein the bowl metal temperature and the exhaust section shell metal temperature are applied as inputs to the rotor expansion neural network model.

* * * * *